Nov. 9, 1965  P. J. BROWNSCOMBE  3,216,316
MIRROR SYSTEMS

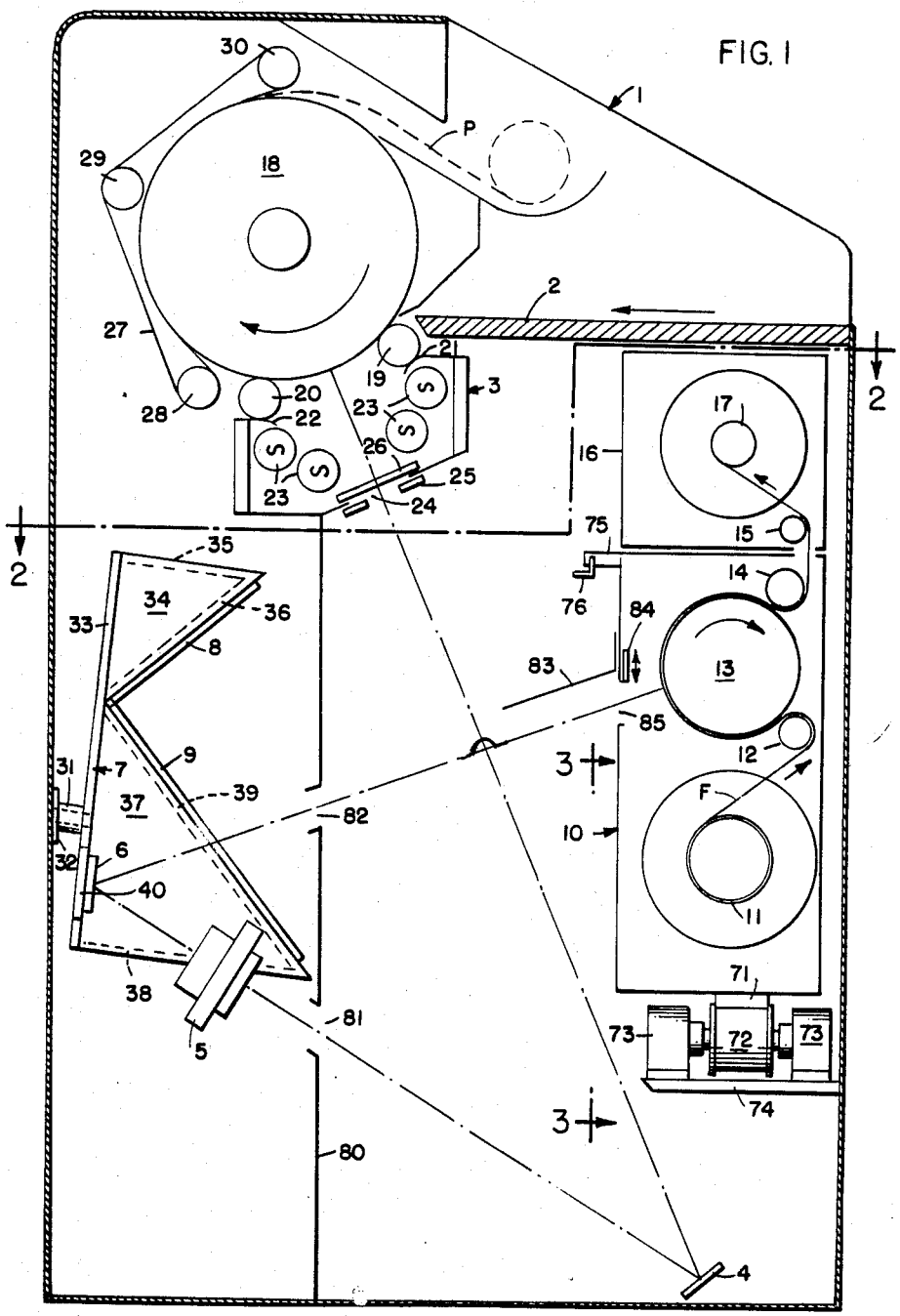

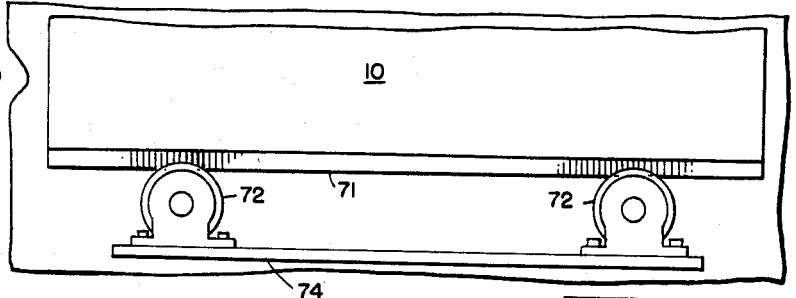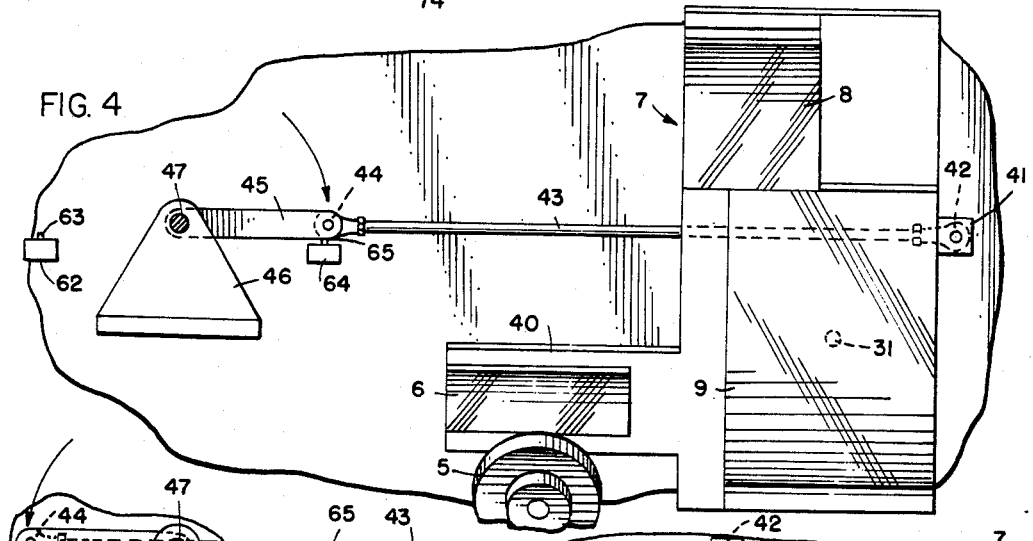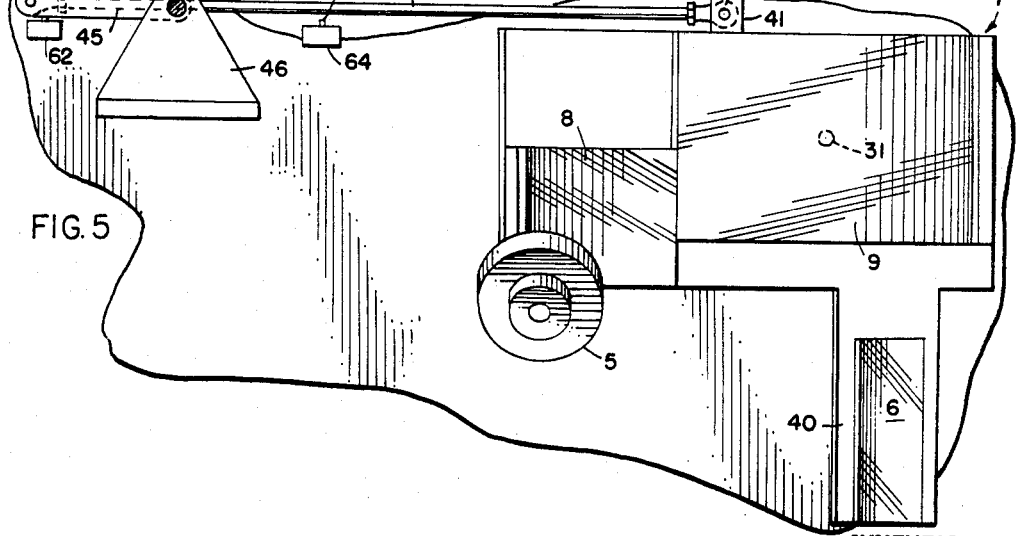

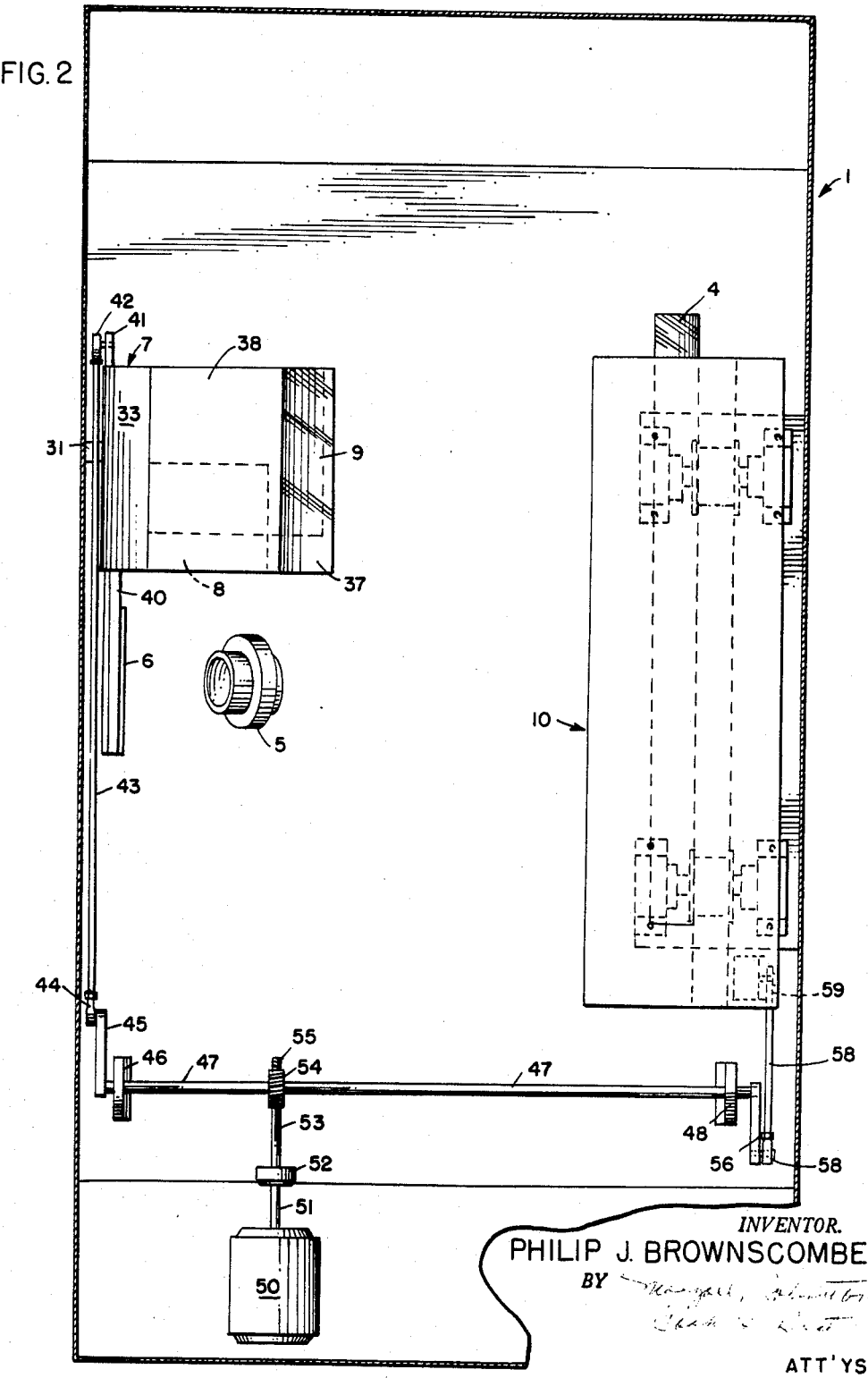

Filed Aug. 30, 1961  4 Sheets-Sheet 4

INVENTOR:
PHILIP J. BROWNSCOMBE
BY

ATT'YS

United States Patent Office 3,216,316
Patented Nov. 9, 1965

3,216,316
MIRROR SYSTEMS
Philip J. Brownscombe, Millington, N.J., assignor to Eugene Dietzgen Co., Chicago, Ill., a corporation of Delaware
Filed Aug. 30, 1961, Ser. No. 134,877
11 Claims. (Cl. 88—24)

This invention, in general, relates to photographic machines and, more particularly, relates to machines for the photographic reproduction of markings, printing, drawings, etc. on paper sheets and the like onto photographic paper. This invention especially relates to improvements in mirror systems and mirror components used for the reflection of a right-reading or a reverse-reading image to the photographic paper.

Briefly, the photographic machines of the invention comprise a cabinet containing an image-exposure section wherein the material to be reproduced is fed. This section is lighted. The image on the paper is reflected inside the cabinet by a lens and folded mirror system to an image-recording section wherein it is reproduced on photographic paper.

One of the salient features of the invention is a mirror component of the mirror system. This component contains a first planar mirror and a pair of intersecting planar mirrors substantially at right angles to each other. The line of intersection of the pair of mirrors lies substantially in an extension of the plane of the first planar mirror. The plane which dissects the right angle between the pair of planar mirrors preferably is substantially normal to an extension of the plane of the first planar mirror in order to produce the most distortion-free image on the photographic paper in accordance with the embodiment of a photographic machine of the type illustrated and described in this application.

The first planar mirror and the pair of planar mirrors are mounted in the machine in a manner so that they can be shifted into and out of the light ray path in the folded mirror system. Depending upon the mirror arrangement and the type of the lens or lenses used, one of the first planar mirrors and the pair of mirrors at right angles to each other will reflect a right-reading image onto the photographic paper while the other will reflect a reverse reading image onto the photographic paper. One or the other of said mirrors is used in the folded mirror system—depending upon the type of image desired.

The changing in the mirror system from the first planar mirror to the pair of mirrors at substantially right angles to each other, or vice versa, results in a shifting of the image reflected to the photographic paper in the camera section of the photographic machine. Therefore, the photographic machine is designed so that the camera (the image recording section) is shiftable a distance corresponding to the displacement of the image reflected by the folded mirror system upon shifting of the first planar mirror or the pair of mirrors into the place of the other in the folded mirror system. In the embodiment illustrated, the mirror system is designed so that the displacement of the image resulting from this change is a horizontal linear displacement. The camera section is, accordingly, mounted so that it can be shifted linearly at a distance corresponding to the linear displacement of the reflected image. The shifting of the camera section can be done by manually operated or power operated means separate from the means for shifting the aforesaid mirror component or the two can be mechanically linked so that the shifting of the mirror component to replace the first planar mirror by the pair of mirrors or vice versa will simultaneously shift the camera section between a right-reading and a reverse-reading position. The latter is more desirable because it avoids the possibility of the operator shifting the mirror system and forgetting to shift the camera.

In accordance with a preferred embodiment of the invention, the mirror component containing the first planar mirror and the pair of mirrors at substantially right angles to each other comprises a base member upon which said mirrors are mounted with the line of intersection of the pair of mirrors at substantially right angles to each other lying substantially in an extension of the plane of the first planar mirror. The plane which bisects the right angle between the pair of mirrors is substantially normal to an extension of the plane of the first planar mirror. The line of intersection of the mirrors in the pair of mirrors preferably is substantially parallel with the longitudinal axis of the first planar mirror in a system where the linear displacement between a right-reading and a reverse reading image is desired to be confined to a substantially horizontal linear displacement.

The camera is a flow type camera in which the image is a long, narrow portion of the moving copy. The copy moves through an arcuate path as does the light-sensitive paper or film in the camera. The length of the narrow image is perpendicular to the direction of motion of both the copy sheet and the light-sensitive film or paper.

An unusual aspect of the mirror system of the invention is the means by which the long, narrow image is reverted by the pair of right angle mirrors. The reversion of the image is an end-for-end reversion of the elongated image which is achieved by placing the lens ahead of and in close proximity to one of the mirrors of the pair of right angle mirrors. The light rays from the lens all are directed into the one mirror, are reflected to the other mirror (in which process the image reverts end-for-end), and are reflected from the latter mirror to the camera section. The end-for-end reversion has the advantage that the reverse reading and right-reading images can be recorded correctly without reversing the direction of travel of the light-sensitive paper or film. Hence, the motion of the copy sheet and the light-sensitive paper or film remains the same in both types of recording. This is an advantage over the usual mirror systems where an elongated image is reverted about its longitudinal axis. In such cases, the direction of motion of either the copy sheet or the film must be reversed when changing from a right-reading to a reverse reading recording, or vice versa, in order to record correctly the desired type of image.

Having briefly described the salient features of the invention, a specific embodiment of the invention in its various aspects is illustrated in the accompanying drawing and described hereinafter in detail. Other embodiments of the invention employing the same or equivalent principles as herein taught may be used and structural changes may be made as desired by those skilled in the art without departing from the true spirit and principles of the invention.

In the drawings:

FIG. 1 is a diagrammatic illustration in side elevation of a photographic reproduction machine embodying a mirror system for applying the principles of the invention;

FIG. 2 is a cross-sectional view of the cabinet taken on section 2—2 of FIG. 1, showing the internal components of the photographic reproduction machine;

FIG. 3 is a fragmentary sectional view taken on section 3—3 of FIG. 1;

Figure 6:
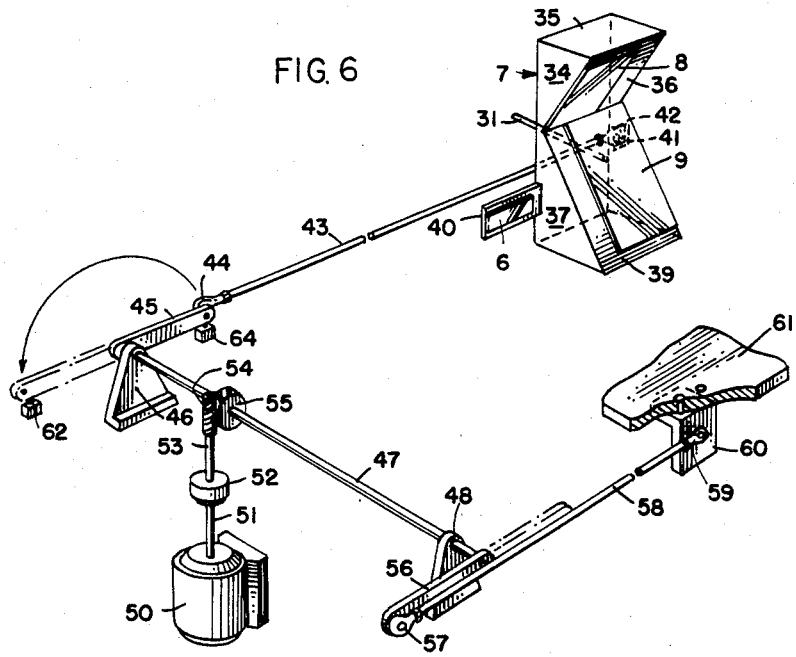
Figure 7:
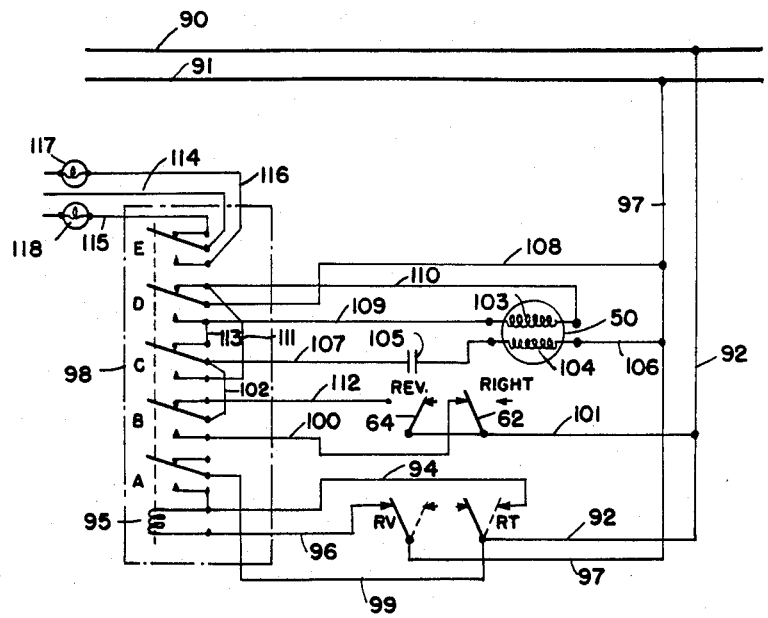

FIG. 4 is a side elevation of a pivotable base member containing the first planar mirror and the pair of planar mirrors at substantially right angles to each other together with a mechanism for rotating the base member to shift either the first planar mirror or the pair of mirrors into the focal zone of a lens in the folded mirror system, the first planar mirror being positioned in said focal zone;

FIG. 5 is a view similar to FIG. 4 with the pair of mirrors at right angles to each other in said focal zone;

FIG. 6 is a perspective view of a power operated mechanical linkage for pivoting the base member on which the mirrors are mounted and simultaneously shifting the camera section; and FIG. 7 is a diagrammatic illustration of a portion of the wiring system for a photographic reproduction machine embodying the principles of the invention.

While the subject matter of this invention is directed to the mirror components and mirror system, a brief description of the machine illustrated semi-diagrammatically in FIG. 1 will be made to show one embodiment of an environment in which the mirrors and the mirror system can be utilized. The invention herein, however, is useful in many types of apparatus or machines.

Referring to FIG. 1, the photographic reproduction machine 1 has a rigidly mounted paper feed board 2 on which is laid paper to be fed through the machine and photographed. Briefly, the components of the machine constitute an exposure chamber 3 which is lighted by means later described. The light from the chamber 3 is reflected in the form of an elongated image by the planar mirror 4 through lens 5 onto planar mirror 6 mounted on the frame 7. The frame 7 is pivotally mounted and has mounted thereon a pair of planar mirrors 8 and 9 which are substantially at right angles to each other with the junction of the mirror planes lying substantially in the extended plane of the mirror 6. In the mirror system disclosed, the image reflected by the mirror 6 to the camera section of the machine is a reverse reading image, i.e., an image reading from right to left.

The mirrors 8 and 9 may be pivoted into reflecting position with respect to the lens 5 to give a system which will provide a right-reading image of the material photographically reproduced by the machine. The line of intersection of the planes of mirrors 8 and 9 is substantially parallel to the direction of motion of the film in the camera 10 when the mirror 8 is positioned in front of the lens 5. The lens 5 is positioned in close proximity to the mirror 8 when the mirrors 8 and 9 are in reflecting position with respect to the lens 5 and all of the light from the lens 5 falls on the mirror 8. It is then reflected to the mirror 9 from which it is reflected to the camera section of the machine.

The light from the mirror 6 or mirrors 8 and 9 is reflected into the photographic reproduction section or camera section 10 which contains a supply roll 11 of light-sensitive paper or film F. The light-sensitive material is conveyed around the roller 12 to the surface of the exposure roller 13. The exposed film is then conveyed around the roller 14 and over roller 15 in the magazine section 16, whereupon it is wound on the magazine spool 17. At any desired time, the magazine section can be removed from the machine for development of the exposed film. The camera section 10 has been illustrated diagrammatically. It is described and illustrated in greater detail in my copending application filed concurrently herewith, the disclosure of which is incorporated herein by reference as if it were set forth in its entirety.

The paper containing the copy to be reproduced is conveyed to the exposure section 3 by means of a rotatably driven roller or drum 18 having shallow grooves in its cylindrical surface. Rollers 19 and 20 rotate in contact with the cylindrical surface of the roller 18 and extend along the length thereof. Resilient, flexible strips 21 and 22 are mounted on the exposure chamber 3 and ride on the cylindrical surface of the rollers 19 and 20, respectively. They provide a substantially air-tight contact between the exposure chamber 3 and the rollers 19 and 20.

The exposure chamber 3 is lighted by a series of elongated lighting tubes 23, e.g., fluorescent tubes. The side of the exposure chamber 3 opposite the roller 18 has an elongated opening 24 with a longitudinal axis of the opening extending in the same direction as the axis of the roller 18. The size of this opening can be adjusted by adjustable shutter 25 comprising a pair of elongated plates movable toward and away from each other. The opening 24 is covered with a glass plate 26. The exposure section 3 is described in greater detail in my copending application filed concurrently herewith, the disclosure of which is incorporated herein by reference as if it had been set forth in its entirety.

After the copy sheet P passes through exposure chamber 3, it passes under a series of bands or belts 27 which ride against the rear surface of drum 18. These bands or belts are mounted on freely rotatable rollers 28, 29, 30 mounted on the machine frame. The belts or bands 27 are driven by drum 18 and carry the copy sheet between them and the drum 18 over the rear surface of drum 18 to return the copy sheet P to the front of the machine.

The shutter 25 is adjusted to the desired slit opening and either the mirror 6 or the mirror 8 is positioned in front of the lens 5, depending upon the type of reproduced image which is desired. The machine is turned on and the drum 18 begins to rotate. The fluorescent lamps 23 are lit when the machine is turned on. The copy sheet is slid along the paper feed board 2 and its leading edge is picked up between the nip of the roller 19 and the drum 18. It is conveyed into exposure chamber 3.

The exposure chamber 3 is connected by ductwork with a blower (not shown). The chamber 3 is substantially air-tight so that the air blown therein maintains the chamber at a pressure somewhat above atmospheric pressure. The drum 18 has a reflective, white surface and preferably has a series of circumferential, shallow grooves whereby the paper on the roller side is in communication with the atmosphere. This keeps the roller side of the paper at atmospheric pressure, while the opposite side of the paper is slightly above atmospheric pressure. The pressure differential holds the paper tightly against the surface of the drum 18 as it is conveyed through exposure chamber 3.

As the copy sheet enters the exposure chamber 3, the drive for the camera section 10 is energized so that the film or light-sensitive paper begins to move through the camera section. The relative velocity of the copy sheet moving through the exposure chamber 3 and the film or light-sensitive paper moving through the camera section 10 in exposure to the image from the copy sheet is correlated to provide a relative velocity corresponding to the reduction ratio.

To achieve this purpose, the drum 18 and the roller 13 in the camera section 10 may be driven at the same angular velocity. The diameter of the drum 18 to the diameter of the roller 13 is at a ratio corresponding to the reduction ratio of the size of the image on the copy sheet to the size of the reproduced image on the film or light-sensitive paper. For example, assuming the mirror-lens system 4–5–6 or 4–5–8–9 is designed to provide a reduction ratio of 2:1, the diameter of the drum 18 will be twice the diameter of the drum 13. This arrangement keeps the image of any given line as it is conveyed by the drum 18 across the exposure chamber 3 in proper focus and in alignment with a corresponding point on the film F as it is conveyed and exposed on the drum 13.

The details of construction of the embodiment of the drum 18 and the exposure chamber 3 are disclosed in my copending application Serial No. 134,876, filed of even date herewith, the disclosure of which is incorporated herein by reference as if it had been set forth in its entirety. The details for the drive for the drum 18 and the drive for the camera section 10, as well as the details of construction of the camera section 10, are disclosed in my copending application Serial No. 134,878, filed of even date herewith, the disclosure of which is herein incorporated as if it had been set forth in its entirety.

After the copy sheet has passed through the exposure section 3, it is conveyed under belts or bands 27 over the rear of the drum 18 and returned to the front of the machine. As the trailing edge of the paper leaves the exposure chamber 3, the drive for the film or light-sensitive paper in the magazine section 10 is deenergized by means disclosed in the aforesaid copending application. A shutter 84 for the opening 85 in the camera section 10 preferably is provided and operated in a manner so that the shutter closes when the film drive is deenergized and opens when the film drive is energized.

After briefly describing the operation of the machine illustrated in FIG. 1, reference is now made to FIGS. 2–7 which illustrate in detail the lens-mirror system by which either a right-reading or a reverse reading image is projected and reproduced on the light-sensitive paper or film. The frame 7 for the pivotable mirror components is pivotally mounted on a hub 31 rotatably journalling an axle connected to the frame 7. The hub 31 is rigidly mounted on a rigid frame member 32 of the machine. The frame 7 is of rigid construction and comprises a rear plate 33. At one end of the plate 33 there is attached thereto a pair of upper and lower triangular plates 34 and an end plate 35 extending between and connected to the plate 33 and plates 34. A plate 36 extends between and is connected to the triangular plates 34. These plates form a rigid, hollow triangular frame at one end of the base plate 33. A similar rigid, hollow, triangular frame is provided at the other end of base plate 33 by upper and lower triangular plates 37 connected to the base plate 33 and plates 38 and 39 extending therebetween.

The frame 7 is constructed in a manner so that the plates 36 and 39 are disposed substantially at a right angle with respect to each other. Upon the plates 36 and 39 are mounted the mirrors 8 and 9, respectively, which mirrors are first surface mirrors whose reflective planes intersect substantially at 90°.

The base plate 33 has a projecting segment 40 projecting outwardly from one side thereof. The first surface mirror 6 is mounted on the projecting segment 40. The planar mirror 6 is positioned on the frame 7 so that an extension of the plane of its reflecting surface lies exactly or very close to the line of intersection of the planes of the reflecting surfaces of the mirrors 8 and 9. Furthermore, the planes of the reflecting surfaces of the mirrors 8 and 9 preferably are at about 45° angles with respect to the extended plane of the reflecting surface of the mirror 6 so that the plane which bisects the right angle between the pair of mirrors 8 and 9 is substantially normal to the extension of the plane of the mirror 6.

The mirror frame 7 may be pivoted by hand, if desired, or by manually operated mechanical linkage. It is preferred, however, that the mirror frame 7 be pivoted to place the mirror 6 or the mirror 8 in front of the lens 5 by a motor operated linkage. For this purpose, the frame 7 has a small extension 41 upon which is mounted a pivot connection 42 at the end of a link arm 43. The link arm 43 has a pivotal connection 44 to a swinging arm 45 fixedly mounted on a rotatable shaft 47. The shaft 47 is rotatably journalled in bearings 46 and 48 at opposite ends thereof.

The shaft 47 and its crank arm 45 are rotated by a reversible electric motor 50 whose drive shaft 51 is coupled to a slip clutch 52. The output shaft 53 of the slip clutch 52 has a worm gear drive connection 54, 55 drivingly connecting the motor 50 to the shaft 47.

Inasmuch as the shifting of the mirrors results in a lateral displacement of the image reflected thereby to the camera section 10, the camera section should be shifted a distance corresponding to the lateral displacement. This is achieved by providing a crank arm 56 on the shaft 47. The crank arm 56 is connected to a link 58 by pivotal connection 57. The opposite end of the link 58 is connected by pivotal connection 59 to a bracket 60 mounted on the bottom panel 61 of the camera section 10. Thus, when the motor 50 is energized to cause the mirror system to pivot via rotation of the shaft 47 and crank arm 45, the rotation of the crank arm 56 causes the camera to shift.

The crank arms 45 and 56 are pivotable through an angle of 180°. Their pivoting is controlled by a pair of limit switches 62, 64 whose switch actuator buttons 63 and 65, respectively, are mounted in the machine so that they are contacted by the crank arm 45 at each end of the 180° arc. The limit switches 62, 64 are connected in the electrical circuit of the reversible motor 50 as hereinafter described so that the motor is deenergized when the crank arm 45 opens either of the limit switches. The slip clutch 52 is provided in the drive of the motor 50 as a safeguard against failure of one of the limit switches to deenergize the motor circuit.

The camera section 10 is mounted in the cabinet 1 of the photographic reproduction machine so that it can be laterally shifted by the crank arm 56 and interconnecting link 58. For this purpose, the bottom panel of the camera section 10 has attached thereto a bar 71 extending along the bottom panel of the camera section 10. The bar 71 rides on a pair of rollers 72 which are rotatably journalled in bearings 73. The bearings 73 are supported in the cabinet 1 on a frame member or plate 74. The camera section 10 has a slotted guide bar 75 mounted on a side thereof. The slot in the bar 75 rides on a guide plate 76 which is rigidly mounted in the cabinet 1.

In order to minimize reflection of stray light inside the cabinet 1 to film or light-sensitive paper F, the cabinet 1 is provided with a divider plate 80, preferably having a black or other non-reflective surface. The divider plate 80 has a pair of elongated openings 81, 82 which permit the reflected image from the exposure chamber 3 to pass through to the divider plate. The camera section 10 is provided with a canopy plate 83 above the opening 85 to prevent direct light from the exposure chamber 3 from entering the opening 85 of the camera section 10.

In the mirror system disclosed in FIG. 1, the image reflected in the mirror 4 through lens 5 reflects off the mirror 6 to produce a reverse reading image on the light-sensitive paper or film F. The mirrors are positioned so that the longitudinal axis of the narrow image reflected to the camera section 10 is parallel with the axis of rotation of the roller 13.

When the mirror 8 is pivoted into position in front of the lens 5, the light rays from the lens 5 are all directed onto the mirror 8. From the mirror 8, the light rays are all reflected to the mirror 9 from which they are, in turn, reflected to the film or light-sensitive paper in the camera section 10.

The elongated image directed against the mirror 8 is flopped or reversed about the transverse axis of the elongated image in the course of its reflection by mirrors 8 and 9 so that the image reflected to the film in the camera section is a right-reading image.

To illustrate, looking at the mirrors 8 and 9 as they appear in FIG. 5, the left-hand side of the elongated image directed against the mirror 8 is reflected to the mirror 9 from which the left-hand side of the image on the mirror 8 is reflected from the right-hand side of the mirror 9. Similarly, the right-hand side of the image on the mirror 8 is reflected from the left-hand side of the mirror 9.

The arrangement of mirrors 8 and 9, in the arrangement previously described where the light projected from the lens 5 all strikes the mirror 8, is the most sound arrangement from a production standpoint because, while the mirrors 8 and 9 should be substantially at right angles to each other, it is not necessary to make the right angle at extremely close tolerances. While this arrangement results in a lateral displacement of the reflected image from the mirrors 8 and 9 as compared with the reflected image from the mirror 6 and necessitates a shifting of the camera section to compensate for lateral displacement of the image, it nonetheless, from a production viewpoint, constitutes the preferred arrangement.

It is possible, however, to utilize the right angle mirrors 8 and 9 in a slightly different manner which will eliminate the lateral shifting of the projected image. This arrangement, however, requires extremely close tolerances in the 90° angle between the mirrors 8 and 9. In this arrangement, the mirrors 8 and 9 are pivoted so that the bisecting plane between the planes of the mirrors 8 and 9 extends through the center of the lens 5. In this arrangement, one half of the elongated image in the lens 5 strikes one mirror while the other strikes the other mirror. Each half reflects to the other mirror and, thence, to the camera section 10. Unless, however, the mirrors 8 and 9 are within seconds of a degree above or below 90° with respect to each other, the reflected image falling on the film in the camera section will either overlap and blur slightly or will be spaced apart slightly, depending upon whether the mirrors are slightly less or slightly more than exactly 90° with respect to each other. These problems do not arise where the lens 5 is positioned so that all of its light is directed against one mirror.

The circuit for motor 50 and its control switches is shown in FIG. 7 where current is supplied across lines 90 and 91. Switches RT and RV are manually actuatable switches mounted on the cabinet of the reproduction machine. Switch RV is normally closed and is opened momentarily to switch the mirror system to a reverse reading system in which mirror 6 is positioned in front of lens 5. Switch RT is normally open and is closed momentarily to switch the mirror system to a right-reading system in which mirror 8 is positioned in front of lens 5.

To explain the operation of the circuit, let it be first assumed that the mirror system is in the reverse reading position shown in FIGS. 4 and 6. The limit switches 62 and 64 are normally closed switches. When the crank arm 45 is in the position shown in FIG. 6, switch 64 is open. To switch the mirror system to a right-reading system, switch RT is momentarily closed. This completes a circuit through conductor 92, switch RT, conductor 94, solenoid 95 of relay 98, conductor 96, switch RV and conductor 97. The blades of relay switches A, B, C, D and E move into contact with the lower contact points of the respective switches. Relay switch A closes a holding circuit for the solenoid 95 through conductor 99 to keep the solenoid energized after switch RT is released and opens.

The contacts of relay switch B are connected by conductors to line 92 through limit switches 62 and 64. The lower contact of relay switch B is connected by conductor 100, limit switch 62 and conductor 101 to line 92. The blade of switch B is connected by conductor 102 to the blade of relay switch C.

Relay switches C and D are connected to the windings 103 and 104 of the split phase motor which has a capacitor in the circuit of winding 104. The direction of rotation of motor 50 is dependent upon the relative polarities of windings 103 and 104, and circuits through relay switches C and D operate to reverse the relative polarity of winding 103 with respect to winding 104. With the blades of switches C and D touching the lower switch contacts, winding 104 of the motor 50 is energized by a circuit through conductors 102, 106 and 107, switch B, conductors 101 and 100 and switch 62 while winding 103 is energized by a circuit through conductor 108, switch D, conductors 109, 110, and 111, switch C, conductor 102, switch B and conductors 100 and 101 and limit switch 62. The energized motor drive swings crank arms 45 and 56 over a 180° arc during which time switch 64 closes when arm 45 leaves its contact position on limit switch 64. The motor remains energized until the arm 45 contacts limit switch 62 and opens the switch. This opening of switch 62 opens the circuits of both windings 103 and 104 of motor 50, and it stops. The mirror system is now in its right-reading position. Switch 62 is open, and switch 64 is closed.

To change the mirror system to a reverse reading system, switch RV is momentarily closed. This breaks the relay holding circuit through relay switch A, and the relay switches snap back to the position shown in FIG. 7. Winding 104 is energized by a circuit through conductors 102, 106 and 107, switch B, conductor 112, limit switch 64 and conductor 101. Its polarity remains the same as in the previous instance. Winding 103, however, has a polarity which is reversed with respect to the previous instance in that its circuit is now completed through coductor 108, switch D, conductors 109, 110 and 113 to switch C. The circuit from switch C to line 92 is the same as described with respect to the circuit of winding 104.

The motor drive continues until the crank arm 45 touches switch 64 and opens it. The opening of switch 64 breaks the circuit of both windings 103 and 104, and the motor 50 stops with the mirror 6 in front of lens 5.

Relay switch E has its blade connected to a conductor 114 on one side of a circuit while its contacts are connected by lines 115 and 116 on the other side of the circuit. Conductor 116 is connected through a right-reading panel light 117. Conductor 115 is connected through a reverse reading panel light 118. These lights tell the operator of the position of the mirror system in the closed cabinet 1.

The foregoing constitutes but one embodiment of the principles of my invention. Other modifications and variations may be employed without departing from the spirit and scope of the invention and the principles thereof, which invention is set forth in the following claims.

The invention is hereby claimed as follows:

1. A right-reading and reverse-reading mirror system component comprising a base member, a first planar mirror mounted on said base member, and a pair of intersecting planar mirrors also mounted on said base member at substantially right angles to each other with the line of intersection of said pair of mirrors lying substantially in an extension of the plane of said first planar mirror, the plane which bisects the right angle between said pair of mirrors being substantially normal to an extension of the plane of said first planar mirror, a lens, and means for alternately shifting of said first planar mirror and said pair of mirrors into the light path of said lens to receive all of the rays from said lens on said first planar mirror and reflect them and to receive all of the rays from said lens on only one of said mirrors of said pair of mirrors and reflect them onto the other of said pair of mirrors from which they are further reflected.

2. In a mirror system for a photocopy machine, a folded mirror system adapted to reflect rays from an image-exposure section of said machine to an image-recording section of said machine, said system including a first planar mirror and a pair of intersecting planar mirrors substantially at right angles to each other, a lens, and means for alternately shifting said first planar mirror and said pair of mirrors into the light path of said lens to receive all of the rays from said lens on said first planar mirror and reflect them and to receive all of the rays from said lens on only one of said mirrors of said pair of mirrors and reflect them onto the other of said pair of mirrors from which they are further reflected to reflect a right-reading or a reverse reading image to said image-recording section.

3. In a mirror system for a photocopy machine, a folded mirror system adapted to reflect rays from an image-exposure section of said machine to an image-recording section of said machine, said system including a first planar mirror and a pair of intersecting planar mirrors substantially at right angles to each other, means for alternatively shifting said first mirror and said pair of mirrors into and out of the ray path of said folded mirror system to reflect a right-reading or a reverse reading image to said image-recording section, and means for shifting linearly said image-recording section.

4. In a mirror system for a photocopy machine, a folded mirror system adapted to reflect rays from an image-exposure section of said machine to an image-recording section of said machine, said system including a first planar mirror and a pair of intersecting planar mirrors substantially at right angles to each other, and means for alternately shifting said first mirror and said pair of mirrors into and out of the ray path of said folded mirror system to reflect a right-reading or a reverse reading image to said image-recording section and simultaneously shifting linearly said image-recording section a distance substantially equal to the linear displacement of the image reflected by said folded mirror system upon shifting one of said first planar mirrors and said pair of planar mirrors in place of the other in said folded mirror system.

5. A light reflecting system comprising an optic lens, a base member, a first planar mirror mounted on said base member, and a pair of intersecting planar mirrors also mounted on said base member at substantially right angles to each other with the line of intersection of said pairs of mirrors lying substantially in an extension of the plane of said first planar mirror, the plane which bisects the right angle between said pair of mirrors being substantially normal to an extension of the plane of said first planar mirror, a lens, and means for alternately shifting said first planar mirror and said pair of mirrors into the light path of said lens to receive all of the rays from said lens on said first planar mirror and reflect them and to receive all of the rays from said lens on only one of said mirrors of said pair of mirrors and reflect them onto the other of said pair of mirrors from which they are further reflected to provide a right-reading or a reverse reading reflected image.

6. An image reproduction machine comprising a cabinet containing a lighted, image-exposure section and an image-recording section, a mirror system in said cabinet for reflecting the image from said image-exposure section to said image-recording section, means to change said mirror system from a right-reading to a reverse reading reflection to said image-recording section and vice versa with displacement of the image reflected by said mirror system to said image-recording section upon changing said mirror system from a right-reading to a reverse reading reflection and vice versa, and means for shifting said image-recording section between a right-reading recording position and a reverse reading recording position.

7. An image reproduction machine comprising a cabinet containing a lighted, image-exposure section and an image-recording section, a mirror system in said cabinet for reflecting the image from said image-exposure section to said image-recording section, a component of said mirror system comprising a pivotally mounted base member, a first planar mirror mounted on said base member, and a pair of intersection planar mirrors also mounted on said base member at substantially right angles to each other with the line of intersection of said pair of mirrors lying substantially in an extension of the plane of said first planar mirror, the plane which bisects the right angle between said pair of mirrors being substantially normal to an extension of the plane of said first planar mirror, a crank arm, an arm pivotally attached at one one end to said base member and pivotally attached at the other end to said crank arm, and means for turning said crank arm and simultaneously shifting said image-recording section a distance substantially equal to the displacement of the image reflected by said mirror system to said image-recording section upon replacing in the light reflection pattern of said mirror system, by pivotal movement of said base member by said arm and crank arm, one of said planar mirrors and said pair of mirrors with the other.

8. An image reproduction machine comprising a cabinet containing a lighted, image-exposure section and an image-recording section, a mirror system in said cabinet for reflecting the image from said image-exposure section to said image-recording section, a component of said mirror system comprising a pivotally mounted base member, a first planar mirror mounted on said base member, and a pair of intersecting planar mirrors also mounted on said base member at substantially right angles to each other with the line of intersection of said pair of mirrors lying substantially in an extension of the plane of said first planar mirror, the plane which bisects the right angle between said pair of mirrors being substantially normal to an extension of the plane of said first planar mirror, a crank arm, an arm pivotally attached at one end to said base member and pivotally attached at the other end to said crank arm, said image-recording section being mounted on rollers and being linearly movable in said cabinet, and means for turning said crank arm and simultaneosly shifting said image-recording section a distance substantially equal to the displacement of the image reflected by said mirror system to said image-recording section upon replacing in the light reflection pattern of said mirror system, by pivotal movement of said base member by said arm and crank arm, one of said planar mirrors and said pair of mirrors with the other.

9. An image reproduction machine comprising a cabinet containing a lighted, image-exposure section and an image-recording section, a mirror system in said cabinet for reflecting the image from said image-exposure section to said image-recording section, a component of said mirror system comprising a pivotally mounted base member, a first planar mirror mounted on said base member, and a pair of intersecting planar mirrors also mounted on said base member at substantially right angles to each other with the line of intersection of said pair of mirrors lying substantially in an extension of the plane of said first planar mirror, the plane which bisects the right angle between said pair of mirrors being substantially normal to an extension of the plane of said first planar mirror, a crank arm, an arm pivotally attached at one end to said base member and pivotally attached at the other end to said crank arm, said image-recording section being mounted on rollers and being linearly movable in said cabinet, means for turning said crank arm and means for shifting said image-recording section a distance substantially equal to the displacement of the image reflected by said mirror system to said image-recording section upon replacing in the light reflection pattern of said mirror system, by pivotal movement of said base member by said arm and crank arm, one of said planar mirrors and said pair of mirrors with the other.

10. A right-reading and reverse reading mirror system component comprising a pivotal base member, an elongated first planar mirror mounted on said base member, and a pair of intersecting planar mirrors also mounted on said base member at substantially right angles to each other with the line of intersection of said pair of mirrors lying substantially in an extension of the plane of said first planar mirror, the plane which bisects the right angle between said pair of mirrors being substantially normal to an extension of the plane of said first planar mirror, and also being substantially parallel to the longitudinal axis of said first planar mirror.

11. A photographic reproduction machine comprising a cabinet with an image-exposure section in the upper portion of said cabinet, a slotted opening in the lower part of said section through which opening light rays from said exposure section are emitted, an elongated planar mirror near the bottom of said cabinet positioned to receive and reflect light rays from said opening, a lens in said cabinet positioned to receive reflected rays from said elongated planar mirror and project said rays to a zone near a wall of said cabinet, a base member mounted in said cabinet adjacent said wall, said base member carrying a first planar mirror and a pair of intersecting mirrors at substantially right angles to each other, means to shift said base member to bring either said first planar mirror or said pair of mirrors into the projection zone of said lens of the rays from said lens on said first planar mirror and reflect them and to receive all of the rays from said lens on only one of said mirrors of said pair of mirrors and reflect them onto the other of said pair of mirrors from which they are further reflected, and an image-recording section adjacent a wall of said cabinet opposite said first-mentioned wall and positioned to receive and record the image reflected by either said first planar mirror or said pair of mirrors.

References Cited by the Examiner

UNITED STATES PATENTS

| | | | |
|---|---|---|---|
| 2,437,898 | 3/48 | Swanson | 88—24 |
| 2,505,505 | 4/50 | Sachtleben. | |
| 2,823,580 | 2/58 | Gannett | 88—24 |
| 2,845,841 | 8/58 | Collins | 88—24 |
| 2,851,922 | 9/58 | Rosin. | |
| 2,854,901 | 10/58 | Fathauer | 352—94 X |
| 2,940,358 | 6/60 | Rosenthal | 88—24 |

NORTON ANSHER, *Primary Examiner.*

WILLIAM MISIEK, *Examiner.*